United States Patent [19]

Vosbikian

[11] 4,229,033
[45] Oct. 21, 1980

[54] SHOVEL WITH AUXILIARY HANDLE

[76] Inventor: Michael Vosbikian, 3 Pinecrest, Medford, N.J. 08055

[21] Appl. No.: 23,735

[22] Filed: Mar. 26, 1979

[51] Int. Cl.³ .......................... B65G 3/00; A01B 1/22
[52] U.S. Cl. .................................. 294/58; 16/110 R
[58] Field of Search ..................... 294/58, 59, 57, 49, 294/54; 15/143 R, 144 R, 145; 16/114 R, 115, 110 R; 37/53

[56] References Cited

U.S. PATENT DOCUMENTS

| 161,678 | 4/1875 | Gardner | 294/58 |
| 782,097 | 6/1902 | Haviland | 294/58 |
| 1,151,012 | 8/1915 | Herringstad | 294/58 |
| 1,456,879 | 5/1923 | Newman | 294/58 |
| 1,586,056 | 5/1926 | Walsh | 294/58 |
| 2,416,414 | 2/1947 | Spencer | 294/58 |
| 2,521,441 | 9/1950 | Bickley | 294/58 |
| 2,531,227 | 11/1950 | Lubins | 294/58 |
| 2,772,910 | 12/1956 | Doyle | 294/58 |
| 4,050,728 | 9/1977 | Davidson | 294/58 |

Primary Examiner—James B. Marbert
Attorney, Agent, or Firm—Weiser, Stapler & Spivak

[57] ABSTRACT

The shovel includes a blade with affixed handle extending rearwardly therefrom. A second handle pivotally attaches to the shovel and near the interconnection between the blade and the fixed handle to provide an improved loading and lifting arrangement. The pivotal connection between the second handle and the shovel handle includes a frictional lock to retain the pivotal handle in association with the fixed handle when the second handle is not in use.

8 Claims, 7 Drawing Figures

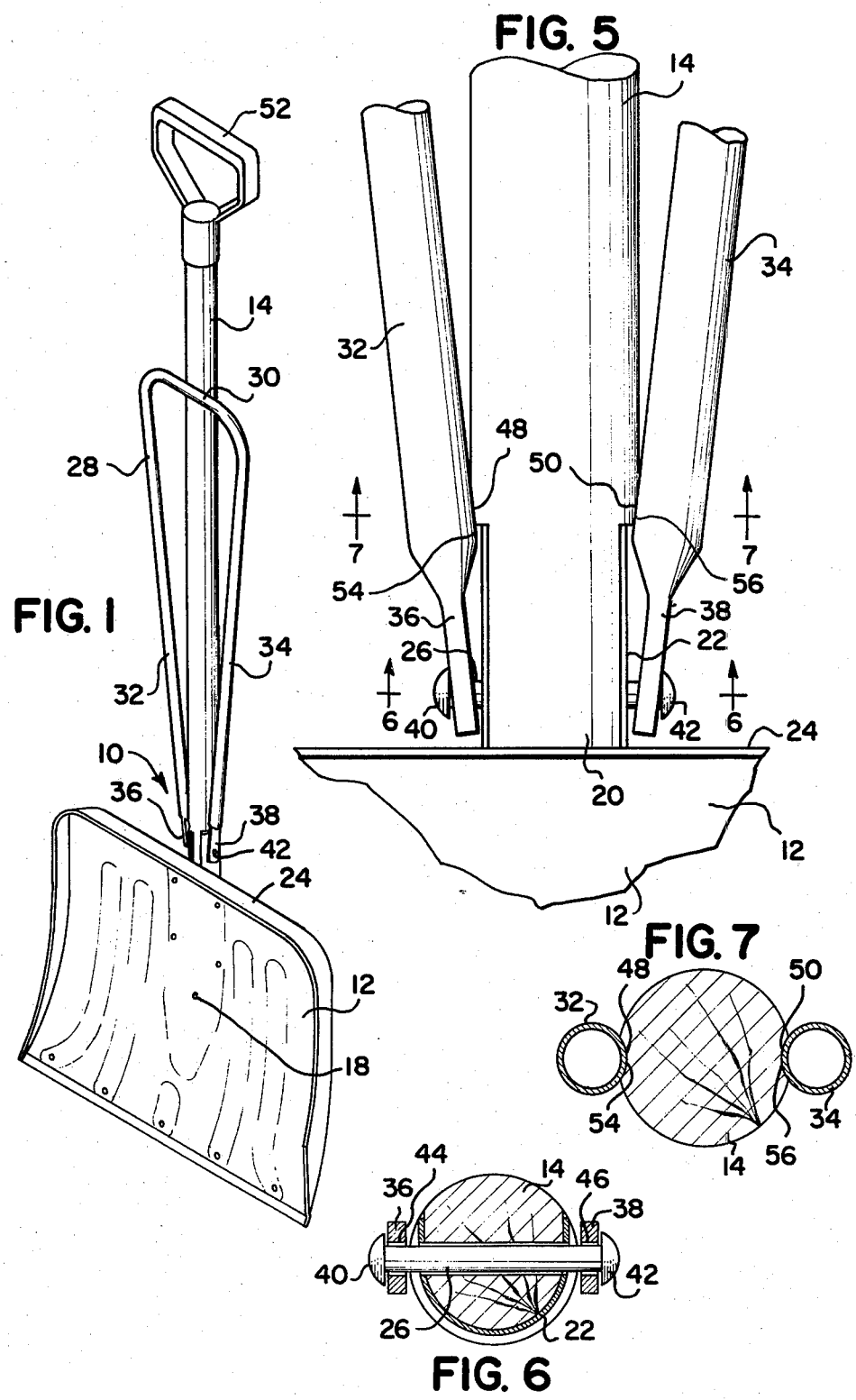

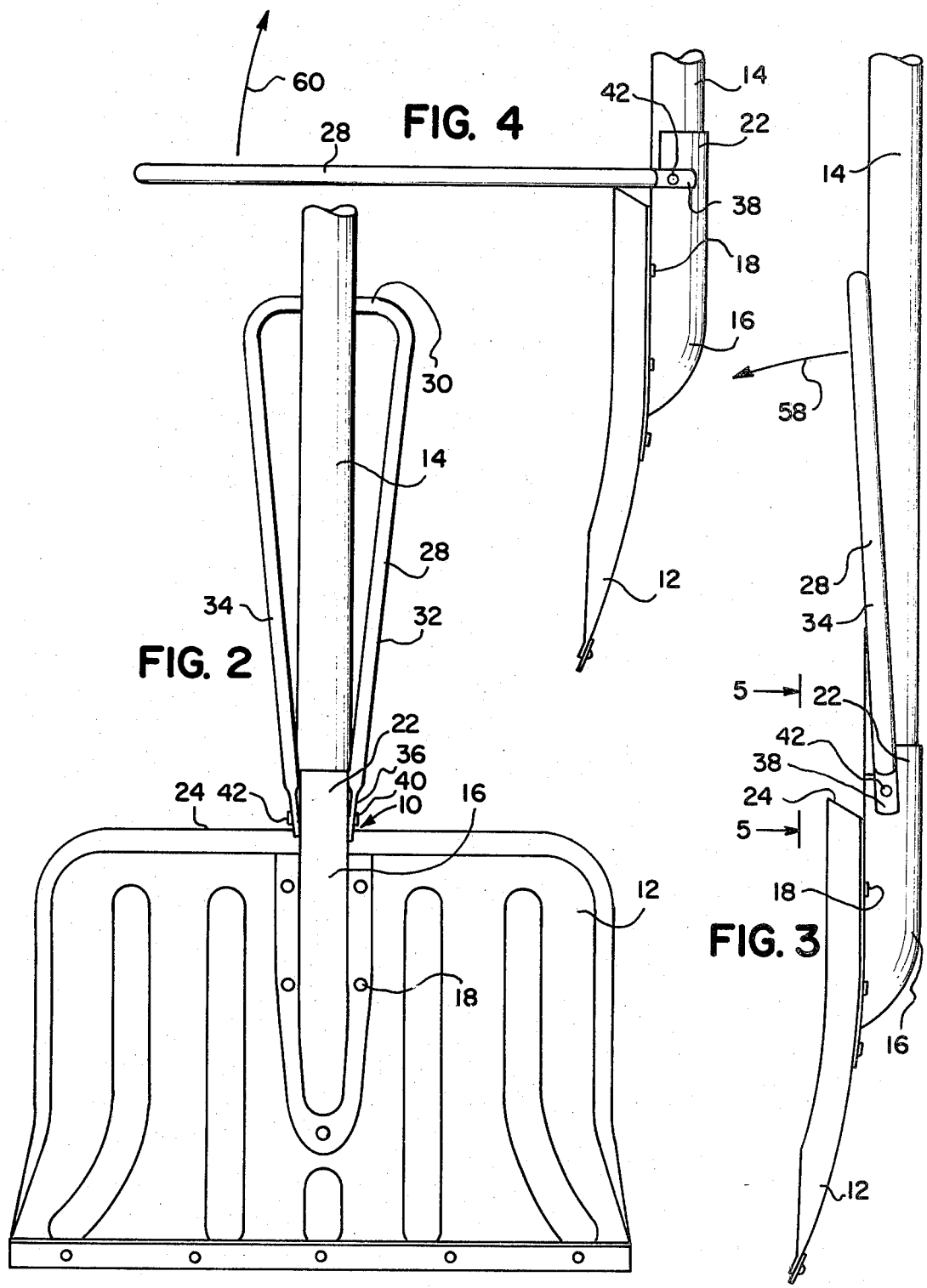

SHOVEL WITH AUXILIARY HANDLE

BACKGROUND OF THE INVENTION

This invention relates generally to the field of shovels and other hand tools, and more particularly, is directed to a shovel of the type which includes an auxiliary, pivotally connected handle.

It is the usual practice when using shovels and similar digging or loading tools to grasp the handle near its rearward end or hand grip with one hand and to grasp an intermediate portion of the handle with the other hand to scoop up and transport a load of snow, dirt or other loose material. In thus using such prior art shovels, the worker must bend over considerably when scooping up the load and sometimes when carrying or disposing of the material. After extended periods of use, these operations become unduly tiring to the worker, especially when the worker is not used to such tasks, for example, when a homeowner must shovel snow to clear his sidewalk or driveway.

Some prior workers in the art have developed auxiliary, secondary handles for use with shovels, for example the auxiliary handle disclosed in U.S. Pat. No. 1,586,056. Such prior attempts have been useful to a degree in reducing the required amount of bending, but have proved deficient in that some designs are too short or cumbersome to permit efficient, erect shoveling. All of the prior art devices of which I am aware have failed to include any type of locking device or detent to permit releasable association of the second handle with the shovel handle when the auxiliary device is not being used.

SUMMARY OF THE INVENTION

The present invention relates generally to the field of snow and other shovels and more particularly is directed to a combination shovel blade and handle which is equipped with an auxiliary or second handle including means to pivot the auxiliary or second handle relative to the shovel handle and detent means to lock the second handle to the shovel handle when the auxiliary device is not in use.

The shovel blade of the present invention includes a rearwardly open, elongated, hollow socket or receptor into which the forward end of the shovel handle conventionally is positioned and bolted in place to secure the parts together. The hollow socket extends rearwardly of the rearward surface of the shovel blade to provide a convenient strong area of attachment or connection for the auxiliary handle or grip of the present invention.

A tubular, generally U-shaped grip or auxiliary handle is pivotally affixed to the forward end of the shovel handle at the handle connecting bolt and is adapted to pivot forwardly relative to the handle for load scooping and transporting purposes. The auxiliary grip or second handle acts as an extension of the users' arm to thereby allow the application of lifting forces at the shovel blade without need for the worker to bend over. In this manner, the worker can apply forces directly to the lowest part of the shovel handle near the blade without actually grasping the lower shovel handle.

The auxiliary handle or U-shaped grip is elongated in configuration and includes an upper web or yoke with integral, similar depending legs. The legs of the auxiliary handle may be of hollow or solid tubular construction which terminate downwardly in flattened ends. The flattened ends are drilled, punched or otherwise treated to provide openings therethrough for receipt of the handle securing and pivot bolt. In the preferred embodiment, the lower flattened ends of the auxiliary grip are spaced apart a distance considerably less than the yoke or top web of the auxiliary handle to thereby impart a generally triangular configuration to the second handle. The yoke should be wide enough to conveniently and comfortably be grasped by one hand of the user when the auxiliary handle is in use. Accordingly, the legs of the auxiliary grip slant or incline outwardly from the lower, flattened ends toward the top yoke or hand grip and define spaces between the respective legs and the shovel handle. When it is desired not to utilize the second handle, the second handle can be secured against the shovel handle and the shovel handle can be grasped directly through the auxiliary handle at the said defined spaces.

The thickness of the legs of the auxiliary grip immediately above the flattened ends is utilized to frictionally rub against and engage a lower portion of the shovel handle. When the auxiliary handle or grip is pivoted essentially into alignment with the shovel handle, a detent or frictional engagement is provided to releasably lock the auxiliary grip to the shovel handle. The frictional engagement between the lower leg portions of the auxiliary grip and the lower end of the shovel handle should be sufficient to maintain the association between the shovel handle and the auxiliary grip when the user chooses not to employ the auxiliary grip in the work.

It is therefore an object of the present invention to provide an improved shovel with auxiliary handle of the type set forth.

It is another object of the present invention to provide a novel shovel including an affixed handle and a pivotally attached auxiliary handle to facilitate scooping and transporting loads without bending.

It is another object of the present invention to provide a novel shovel with an auxiliary handle pivotally connected thereto and detent means to maintain alignment of the auxiliary handle relative to the shovel handle.

It is another object of the present invention to provide a novel shovel with auxiliary handle wherein the auxiliary handle is generally U-shaped in configuration with an upper web integrally connecting a pair of downwardly spaced legs and wherein the spacing between the legs is greater at the web connection.

It is another object of the present invention to provide an improved shovel with auxiliary handle that is sturdy in construction, inexpensive in manufacture and of increased efficiency when in use.

Other objects and a fuller understanding of the invention will be had by referring to the following description and claims of a preferred embodiment thereof, taken in conjunction with the accompanying drawings, wherein like reference characters refer to similar parts throughout the several view and in which:

BRIEF DESCRIPTION OF THE DRAWINGS

FIG. 1 is a perspective view of the improved shovel of the present invention.

FIG. 2 is an enlarged, partial, rear elevational view of the shovel of FIG. 1.

FIG. 3 is a partial, side elevational view of the shovel of FIG. 2.

FIG. 4 is a partial, side elevational view similar to FIG. 3 showing the auxiliary handle in pivoted position.

FIG. 5 is an enlarged, partial, detail view of the connection between the shovel handle and the auxiliary handle, looking from line 5—5 of FIG. 3.

FIG. 6 is a cross-sectional view taken along line 6—6 of FIG. 5, looking in the direction of the arrows.

FIG. 7 is a cross-sectional view taken along line 7—7 of FIG. 5, looking in the direction of the arrows.

DESCRIPTION OF THE PREFERRED EMBODIMENT OF THE INVENTION

Although specific terms are used in the following description for the sake of clarity, these terms are intended to refer only to the particular structure of the invention selected for illustration in the drawings and are not intended to define or limit the scope of the invention.

Referring now to the drawings, there is illustrated in FIGS. 1 and 2 a shovel generally designated 10 which comprises a shovel blade 12 which may be of widened design suitable for snow shoveling and an affixed handle 14. A rearwardly facing, hollow socket 16 is conventionally affixed to the shovel blade 12 by a plurality of rivets or other suitable fasteners 18 to provide a conventional receptor to receive therein the forward or lower end 20 of the shovel handle 14 in a tight, sturdy connection. As best seen in FIGS. 2 and 5, the metallic hollow receptor 16 terminates rearwardly in an integral extension 22, which extension extends rearwardly of the rear face 24 of the shovel blade to facilitate attachment of the shovel handle 14 and the auxiliary handle 28.

As illustrated in FIGS. 2, 5 and 6, the lower or forward end 20 of the shovel handle 14 snugly fits within the receptor rear extension 22 and is secured thereto in an immovable junction, such as may be provided by a tight, frictional engagement. Additionally, a bolt, rivet or suitable pin 26 is positioned through the opposite sides of the rear extension 22 and through the lower end 20 of the handle to further assure that the parts remain in fixed association at all times. If desired, a suitable adhesive (not shown) could additionally be utilized to maintain the association of the lower handle end 20 within the receptor 16.

An auxiliary handle or grip 28, which may be formed to a general U-shaped configuration from hollow or solid metallic tubing, is pivotally affixed to the shovel construction 10 to aid in picking up and transporting a load without stooping. As illustrated, the auxiliary handle 28 comprises an integral length of tubing which is bent to form a yoke or hand grip portion 30 with integral, depending legs 32, 34. The legs 32, 34 terminate downwardly in flattened ends 36, 38 which are spaced apart a distance equal to the width of the rear extension 22 of the hollow shank 16. As indicated in FIGS. 1 and 2, the yoke portion 30 extends in length a distance greater than the spacing between the flattened ends 36, 38 of the auxiliary grip legs 32, 34 whereby the legs 32, 34 incline downwardly and inwardly from the yoke 30 toward the respective flattened ends 36, 38.

The ends 36, 38 of the auxiliary or second handle 28 are drilled, punched or otherwise treated to provide openings of suitable size to receive therethrough the pin or rivet 26 in a manner to permit the second handle 28 to pivot thereabout. Left and right heads 40, 42, which may be integral with the pin construction 26, position outwardly of the flattened ends 36, 38 to retain the ends of the legs 32, 34 in close, overfitting, pivotal association with the rear extension 22 of the socket or receptor 16.

As best illustrated in FIGS. 5 and 7, the geometry of the system is arranged to provide frictional engagements 48, 50 between the lower tubular extremities 54, 56 of the auxiliary grip legs 32, 34 and the lower outer periphery of the shovel handle 14. Optionally, the lower tubular extremities 54, 56 could frictionally engage the socket rear extension 22 for the same purpose. The angularity of the legs 32, 34 is designed to facilitate the frictional engagements 48, 50 of the lower extremities of the auxiliary grip legs 32, 34 against the periphery of the handle 14 when the auxiliary handle 28 is substantially aligned with the shovel handle 14. (See FIGS. 1, 2 and 3). The frictional engagements 48, 50 between the auxiliary grip legs 32, 34 and the handle end 20 or socket extension 22 will be sufficient to maintain the substantial alignment by acting as a frictional detent when the auxiliary handle or grip 28 is not in use.

As best seen in FIG. 4, when it is desired to utilize the auxiliary hand grip 28, the frictional engagement 48, 50 between the lower extremities of the hand grip 28 and the lower end 20 periphery of the shovel handle 14 can be easily broken by pulling the auxiliary handle 28 in the direction of the arrow 58, (FIG. 3) to pivot the auxiliary handle 28 about the pivot pin 26 for use in scooping up or transporting loads (not shown). It will be appreciated that once the frictional engagements 48, 50 are broken by pivoting the auxiliary handle 28 relative to the shovel handle 14, the auxiliary handle 28 is then freely pivotal about the pivot pin or rivet 26 to facilitate use of the shovel 10 by grasping both the auxiliary handle yoke 30 and the shovel handle hand grip 52.

When the worker (not shown) no longer wishes to utilize the auxiliary handle 28, he can simply pivot the auxiliary handle 28 in the direction of the arrow 60 (FIG. 4) until the auxiliary handle 28 and shovel handle 14 are substantially in alignment in the manner illustrated in FIGS. 1 and 3. With the parts thus aligned, the frictional engagements 48, 50 (FIGS. 5 and 7) serve to maintain the parts in this alignment without conscious effort on the part of the user. It will be noted that when the auxiliary 28 and shovel handle 14 are in substantial alignment as shown in FIGS. 1 and 3, the worker (not shown) can utilize the shovel 10 in conventional manner without utilizing the auxiliary grip 28 by grasping the shovel handle 14 in the vicinity of its lower end 20 and by grasping the shovel hand grip 52 with his other hand. If necessary, the legs 32, 34 of the auxiliary grip 29 can be spread or bowed above the frictional engagements 48, 50 to allow grasping of the shovel handle 14 in convenient manner through the respective openings defined by each leg 32, 34 and the shovel handle 14.

Although the invention has been described with a certain degree of particularity, it is understood that the present disclosure has been made only by way of example and that numerous changes in the details of construction and the combination and arrangement of parts may be resorted to without departing from the scope of the invention.

What is claimed is:

1. In a shovel of the type including a blade, a rearwardly open socket affixed to the blade and a first handle having its forward end secured within the socket, the improvement comprising a second handle adapted to pivot relative to the first handle about a pivotal connection, said second handle being movable from an aligned position in substantial alignment with the first handle to pivoted positions not in substantial alignment with the first handle;

pivot pin means positioned in a forward portion of said first handle to pivotally connect the second handle to the first handle; and frictional engagement means frictionally engaging a lower portion of the second handle to releasably secure the second handle to the first handle when the second handle is moved to its said aligned position.

2. The shovel of claim 1 wherein the socket extends rearwardly of the shovel blade in a socket extension and wherein the said lower portion of the second handle is frictionally engaged with the socket when the second handle is in its said aligned position.

3. The shovel of claim 1 wherein the second handle comprises a top web and a pair of straight, unbent legs depending therefrom, the legs terminating downwardly in respective, spaced ends.

4. The shovel of claim 3 wherein the spacing between the legs is greater at the top web than at the said ends and wherein the configuration of the second handle is generally triangular.

5. The shovel of claim 3 wherein the legs are tubular and wherein the downward leg ends are flattened.

6. The shovel of claim 1 wherein the frictional engagement means comprises a frictional engagement between the lower portion of the second handle and a lower portion of the first handle.

7. The shovel of claim 1 wherein the second handle comprises a pair of spaced legs and wherein the pivotal connection comprises a pivot pin, the pivot pin being positioned through portions of the said legs whereby the second handle is pivotal about the first handle.

8. The shovel of claim 7 wherein the legs define an opening between a respective leg and the first handle, the first handle being exposed within the opening whereby the first handle may be grasped directly through the opening when the second handle is in its said aligned position.

* * * * *